United States Patent [19]

Suzuki et al.

[11] Patent Number: 5,129,097
[45] Date of Patent: Jul. 7, 1992

[54] PAGING CHANNEL SELECTION SYSTEM IN MOBILE COMMUNICATION SYSTEM

[75] Inventors: Hiroyuki Suzuki; Katsumi Kobayashi, both of Kanagawa, Japan

[73] Assignee: Nippon Telegraph and Telephone Corporation, Tokyo, Japan

[21] Appl. No.: 618,429

[22] Filed: Nov. 27, 1990

[30] Foreign Application Priority Data

Nov. 28, 1989 [JP] Japan .................. 1-306416

[51] Int. Cl.$^5$ ............................. H04Q 7/00
[52] U.S. Cl. ........................ 455/33.2; 455/54.1
[58] Field of Search ............ 455/33, 34, 54, 56, 455/67, 343; 340/825.44, 825.48, 825.52, 311.1

[56] References Cited

U.S. PATENT DOCUMENTS

| | | | |
|---|---|---|---|
| 4,860,003 | 8/1989 | DeLuca et al. | 340/825.44 |
| 4,885,577 | 12/1989 | Nelson | 340/825.44 |
| 4,965,569 | 10/1990 | Bennett et al. | 340/825.44 |
| 4,977,399 | 12/1990 | Price et al. | 455/33 |
| 5,005,014 | 4/1991 | Jasinski | 340/825.44 |

FOREIGN PATENT DOCUMENTS 64-51832 2/1989 Japan.

Primary Examiner—Curtis Kuntz
Attorney, Agent, or Firm—Armstrong & Kubovcik

[57] ABSTRACT

When a mobile station (4) staying in a first paging zone (1) begins communication with a network through a base station by using a paging channel (P1) which is specific to the paging zone (1) and one of speech channels (S11–S20), and finishes the communication in a paging zone (2) after moving from the zone (1) to the zone (2), the paging channel in the waiting state after the speech in the zone (2) is not (P1), but (P2) which is specific to the zone (2). In order to assure that paging channel (P2), a base station in the zone (2) informs the mobile station (4) the paging channel (P2) which should be used in the waiting state in the disconnect signal. Thus, no switching of a paging channel in waiting state because of low receive level of the paging channel signal is necessary, and a quick service after previous speech is possible.

2 Claims, 4 Drawing Sheets

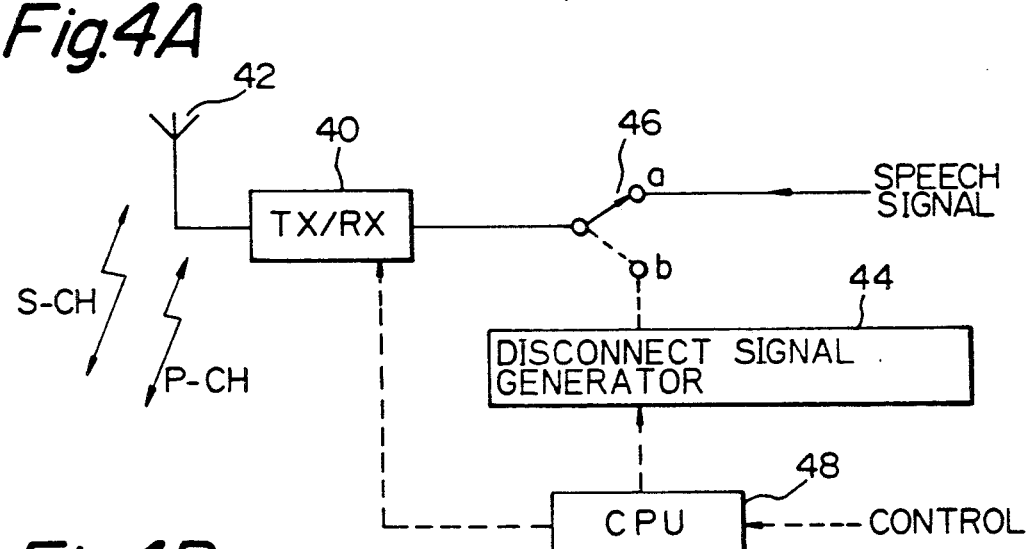
Fig.4A
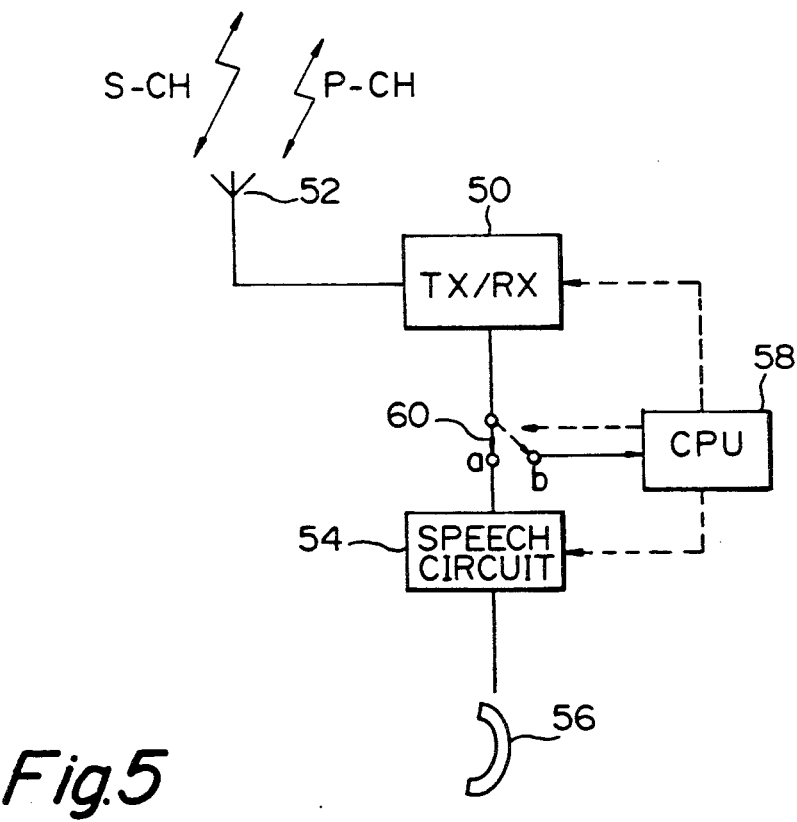
Fig.4B
Fig.5

PAGING CHANNEL SELECTION SYSTEM IN MOBILE COMMUNICATION SYSTEM

BACKGROUND OF THE INVENTION

The present invention relates to a paging channel selection system in a mobile communication system.

The conventional control flow in a mobile station is shown in FIG. 2. The idea of FIG. 2 is shown in the JP patent laid open publication 64-51832 dated Feb. 28, 1989.

FIG. 3 shows a model of a mobile communication, in which the numerals 1, 2 and 3 are paging control zones, and 4 is a mobile station.

In a mobile communication system, a P-channel (paging channel), an S-channel (speech channel), and an A-channel (access channel) are provided between a mobile station and a base station. A P-channel is used for establishing a connection when a call is originated in a network, or a mobile station receives a call. An A-channel is used for establishing connection when a call is originated in a mobile station. When the connection is established, the channel is switched from a P-channel or an A-channel to an S-channel for speech. A mobile station is in a waiting state when no communication is carried out, and receives a P-channel which is broadcast by a base station.

Each base station has specific paging channel (P-ch), and a plurality of speech channels. In FIG. 3, a first zone which is specific to a first base station has a paging channel P1, and ten speech channels S11-S20, a second zone has a paging channel P2 and ten speech channels S21-S30, and a third zone has a paging channel P3, and ten speech channels S31-S40.

When a power switch is put on (10) in a mobile station, the mobile station selects one of the paging channels (P-CH) which are stored in the mobile station so that the selected paging channel has the receive level higher than a predetermined level, and the reception of broadcast information is possible in waiting state (12). When a mobile station stays in the first zone 1, the paging channel P1 which is specific to the zone 1 will be selected. When the paging channel is selected, the mobile station goes into the waiting state (14). The mobile station monitors the receive level of the selected channel (P-ch). When the receive level in that channel is decreased because of the movement of the mobile station to another paging zone, the selection of another paging channel is effected as is the case when the power switch is put on.

During the waiting state, assuming that an originating call or a terminate call occurs, the channel is switched to an S-channel (speech channel), and the communication is effected in that speech channel. When the communication finishes, the channel is switched again to the paging channel (P-CH), and the operation state is changed to the waiting state.

When the mobile station stays in the first paging zone, and does not move to another paging zone during the speech (case a in FIG. 3), there is no problem, and the mobile station operates in the waiting state in the paging channel P1 after speech end.

However, when the mobile station moves to another paging zone (case b in FIG. 3) during the speech, the paging channel which the mobile station takes at the end of the speech is the first paging channel (P1) which was taken at the beginning of the speech. Therefore, it is much possible that the receive level of the paging channel (P1) at the end of the speech is lower than the predetermined level, and the search of the new paging channel (P2) must be effected as is the case when the power switch is put on. Therefore, it takes some time to go to the waiting state after the end of the speech. The new call is impossible from the end of the previous speech to the establishment of the waiting state, and the service quality is decreased by the above problem.

The above problem is serious when the size of paging zones is small as compared with the moving length of a mobile station.

SUMMARY OF THE INVENTION

It is an object, therefore, of the present invention to overcome the disadvantages and limitations of a prior paging channel selection system by providing a new and improved paging channel selection system in a mobile communication system.

It is also an object of the present invention to provide a paging channel selection system which reduces unable time of connection after the end of speech, and provide a better service in a mobile communication.

The above and other objects are attained by a paging channel selection system in a mobile communication system in which a plurality of mobile stations are coupled with a communication network through a base station, and a base station which the mobile station is coupled is switched as the movement of the mobile station so that the mobile station is coupled with the base station which provides the highest receive level, comprising; a base station forwarding a disconnect signal to a mobile station at the end of communication, and said disconnect signal including a disconnect indication and a base station information including a P-channel specific to said base station, and; a mobile station selecting paging channel in waiting state according to said disconnect signal from the base station.

BRIEF DESCRIPTION OF THE DRAWINGS

The foregoing and other objects, features, and attendant advantages of the present invention will be appreciated as the same become better understood by means of the following description and accompanying drawings wherein;

FIG. 4A is a block diagram of a base station according to the present invention, FIG. 4B is a block diagram of a mobile station according to the present invention, and FIG. 5 shows a signal format of a disconnect signal which sent by a base station.

DESCRIPTION OF THE PREFERRED EMBODIMENTS

Figure 1:
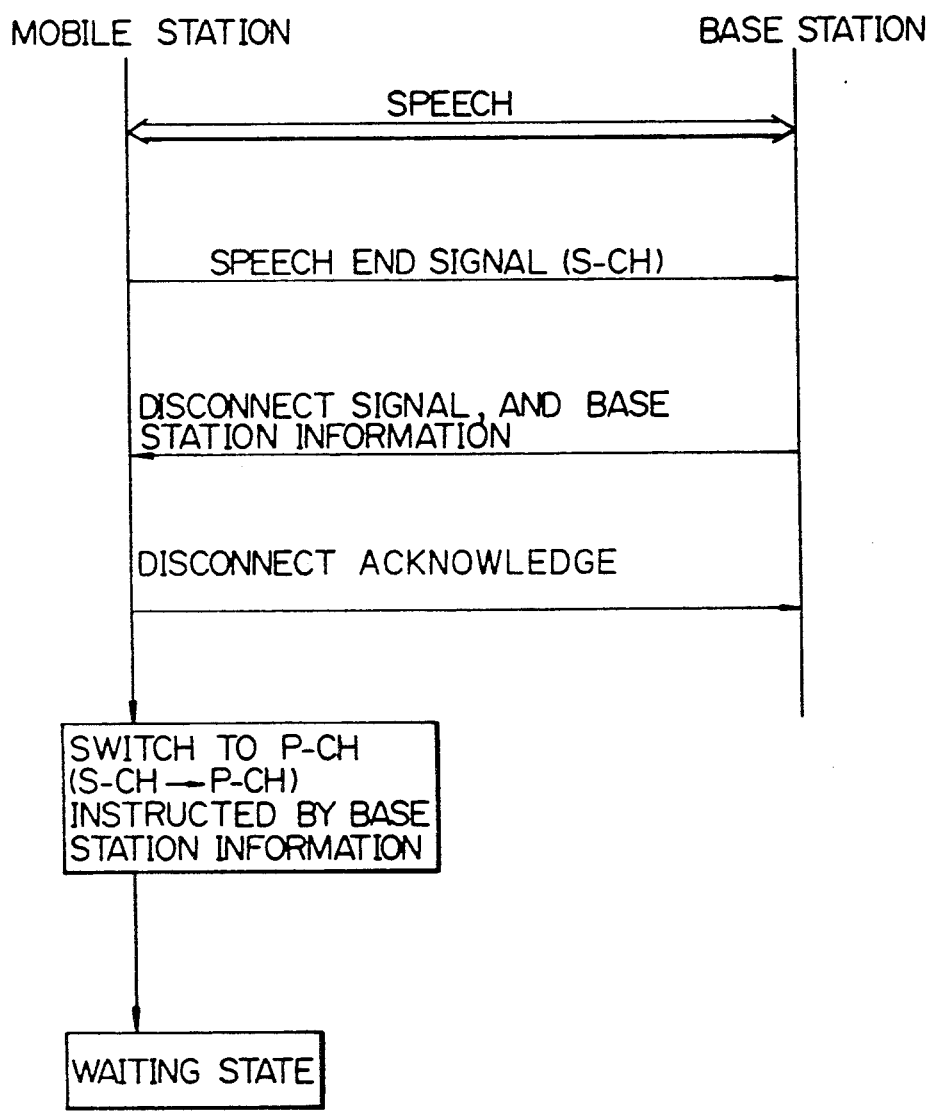
FIG. 1 shows an operational flow of disconnect operation according to the present invention.
Figure 2:
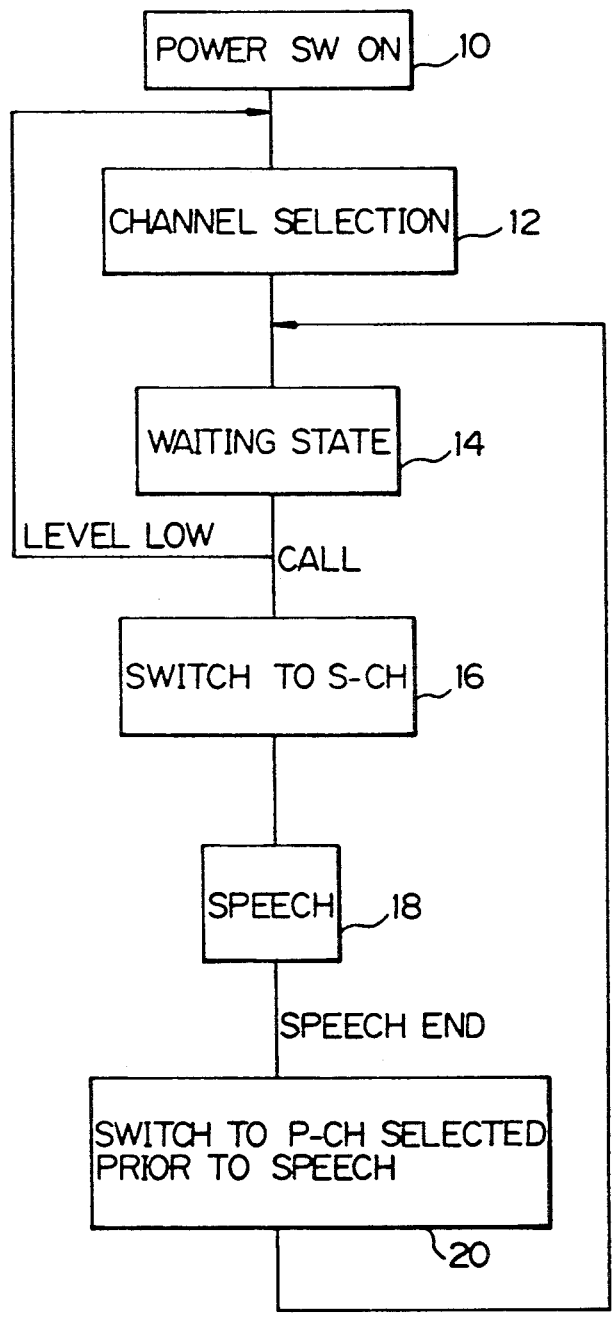
FIG. 2 is an operational flow in paging selection in a prior art.

FIG. 1 shows an operational flow of disconnect operation in a mobile communication according to the present invention.

When a speech finishes, a disconnect signal and a speech end signal are sent between a base station and a mobile station for releasing a radio channel. FIG. 1 shows an operational flow when a speech finishes, and a mobile station subscriber puts a handset down first.

In FIG. 1, it is assumed that a speech is carried out between a mobile station and a network through a base station by using one of the S-channels. When a handset in a mobile station is put down, a mobile station forwards a speech end signal to a base station, which forwards a disconnect signal upon receipt of said speech end signal. When the disconnect signal is sent by the base station, the base station attaches the base station information including a paging channel number (P-ch) of the paging zone which the mobile station stays at the end of the speech, to the disconnect signal. The mobile station switches the channel from the S-channel to the P-channel, and goes into the waiting state by taking the P-channel informed by the base station in the disconnect signal.

When a farer end subscriber in a network puts a handset down first at the end of the speech, the speech end signal in FIG. 1 is not used.

Figure 3:
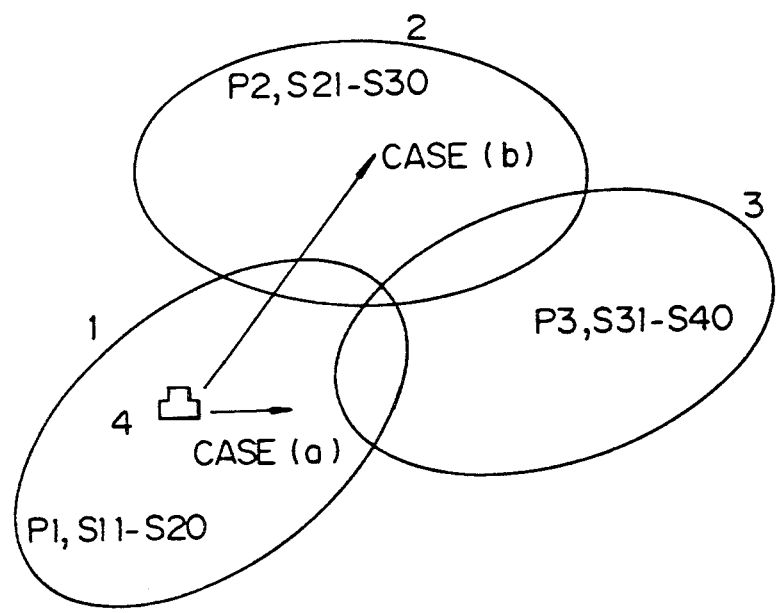
FIG. 3 shows a model of a mobile communication.

It should be appreciated that when a mobile station moves to another paging zone during speech from the paging zone 1 to the paging zone 2 as shown in FIG. 3, a base station and/or a speech channel is automatically switched to provide higher receive level when the mobile station moves to another zone, and therefore, the paging channel instructed by the base station at the end of the speech belongs to the base station where the mobile station stays at the end of the speech, and that paging channel has enough level for waiting in the waiting state. It should be appreciated that it takes very short time for channel switching as compared with that for channel selection, and therefore, an unable time at the end of speech decreases considerably in the present invention.

As a modification of the present invention, a disconnect signal from a base station may include not only a paging channel, but also some information of a base station including control channel information of each base station, and sector information of sectorized zone.

FIG. 4A shows a main portion of a base station. In the figure, a speech signal is transmitted in the air through a switch 46, a transceiver 40 which includes a transmitter and a receiver, and an antenna 42. The channel for communication is an S-channel in speech state, and a P-channel is waiting state. When the base station receives a speech end signal, the switch 46 is switched from the contact (a) to the contact (b) so that the speech signal is switched off, and the disconnect signal is forwarded. A disconnect signal is generated in the disconnect signal generator 44 so that the disconnect signal includes a synchronization bit S, a disconnect indicator, and a base station information which includes the P-channel which is specific to the base station and should be used in the waiting state, as shown in FIG. 5. The CPU (central processing unit) 48 receives the control signal, and carries out the control of the base station.

FIG. 4B is a block diagram of the main portion of a mobile station. When the speech is carried out, the handset 56 is coupled with a transceiver 50 which includes a transmitter and a receiver through a switch 50. The transceiver 50 is coupled with a base station through an antenna 52. When the speech finishes, and the speech end signal is forwarded, the switch 60 is switched from the contact (a) to the contact (b) so that the speech signal is cut off, and the receive signal is applied to the control 58 which is implemented by a chip computer (CPU). The control 58 receives the disconnect signal with the signal format of FIG. 5, and recognizes the P-channel which must be used in the waiting state. So, the control 58 selects the P-channel thus instructed, and goes into the waiting state in said P-channel.

As mentioned above, according to the present invention, a paging channel which is used in a waiting state is informed by a base station at the end of speech, and therefore, a mobile station may recognize a paging channel in the waiting state, and may shift quickly to the waiting state which a new call is acceptable.

Therefore, the present invention is useful in a mobile communication which has a paging control channel.

From the foregoing it will now be apparent that a new and improved paging channel selection system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A paging channel selection system in a mobile communication system, comprising:
    at least one base station means for forwarding a disconnect signal to a mobile station at the end of communication, said disconnect signal including a disconnect indication and a base station information including a paging channel number specific to said base station means; and
    at least one mobile station means for selecting paging channel in a waiting state according to said disconnect signal from the base station means,
    wherein said at least one mobile station means is coupled with a communication network through a respective base station means, and wherein said respective base station means forwards a highest receive level to a respective mobile station means as said respective mobile station means is coupled with said respective base station means due to a movement of said respective mobile station means.

2. A paging channel selection system according to claim 1, wherein said base station means has a switch for selectively connecting speech signal and a disconnect signal generator means operably coupled to a transceiver which is coupled with said respective mobile station means through an antenna, said disconnect signal generator means providing to said respective mobile station means a disconnect signal which has a synchronization bit, a disconnect indication, and a base station information including a paging channel which said respective mobile station means uses in said waiting state.

* * * * *